United States Patent
Deleplace et al.

(10) Patent No.: US 10,482,629 B2
(45) Date of Patent: Nov. 19, 2019

(54) SYSTEM, METHOD AND COMPUTER PROGRAM PRODUCT FOR AUTOMATIC OPTIMIZATION OF 3D TEXTURED MODELS FOR NETWORK TRANSFER AND REAL-TIME RENDERING

(71) Applicant: KUBITY, Paris (FR)

(72) Inventors: Valentin Deleplace, Levallois (FR); Romain Gora, Asnières sur Seine (FR); Clément Marchal, Nanterre (FR); Sylvain Seccia, Paris (FR); Nicolas Schoner, Chatillon (FR); Nicolas Vasseur, Colombes (FR)

(73) Assignee: KUBITY, Paris (FR)

( * ) Notice: Subject to any disclaimer, the term of this patent is extended or adjusted under 35 U.S.C. 154(b) by 0 days.

(21) Appl. No.: 15/501,434

(22) PCT Filed: Sep. 9, 2015

(86) PCT No.: PCT/EP2015/070613
§ 371 (c)(1),
(2) Date: Feb. 2, 2017

(87) PCT Pub. No.: WO2016/038091
PCT Pub. Date: Mar. 17, 2016

(65) Prior Publication Data
US 2017/0228894 A1 Aug. 10, 2017

(30) Foreign Application Priority Data
Sep. 12, 2014 (EP) .................................. 14306405

(51) Int. Cl.
*G06T 9/00* (2006.01)
*G06T 17/20* (2006.01)

(52) U.S. Cl.
CPC ............ *G06T 9/001* (2013.01); *G06T 17/205* (2013.01); *G06T 2210/36* (2013.01)

(58) Field of Classification Search
None
See application file for complete search history.

(56) References Cited

U.S. PATENT DOCUMENTS

2013/0278601 A1* 10/2013 Chen ....................... G06T 15/04
 345/426
2014/0108909 A1* 4/2014 Geelnard .......... G06F 17/30902
 715/234

(Continued)

FOREIGN PATENT DOCUMENTS

| WO | 99/64944 A2 | 12/1999 |
| WO | 2011/110855 A2 | 9/2011 |
| WO | 2013/029232 A1 | 3/2013 |

OTHER PUBLICATIONS

Michael Garland, "Quadric-Based Polygonal Surface Simplification," School of Computer Science, Carnegie Mellon Universtiy, May 9, 1999, CMU-CS-99-105.

(Continued)

*Primary Examiner* — James A Thompson
(74) *Attorney, Agent, or Firm* — Baker & Hostetler LLP

(57) ABSTRACT

A method for automatically optimizing a 3D textured model for network transfer and real-time rendering is based on a quadric simplification algorithm allowing any user to obtain transparently a real-time rendering of a 3D textured model. The algorithm is performed by using predefined heuristics, and is associated with a plurality of simplified versions of the 3D model, each simplified version being associated with a predefined level of detail adapted to the user specific environment.

16 Claims, 5 Drawing Sheets

(56) References Cited

U.S. PATENT DOCUMENTS

2014/0354626 A1* 12/2014 Guskov ................ G06T 17/005
  345/419
2015/0170398 A1*  6/2015 Hsu ........................ G06T 17/20
  345/420

OTHER PUBLICATIONS

D. Shikhare et al., "Compression of large 3D engineering models using automatic discovery of repeating geometric features," Proceedings of the Vision Modeling and Visualization Conference 2001, Nov. 21, 2001, pp. 233-240, XP002561497.

Michael Garland et al., "Simplifying surfaces with color and texture using quadric error metrics," Visualization, Oct. 18, 1998, pp. 263-269, XP010321063.

* cited by examiner

SYSTEM, METHOD AND COMPUTER PROGRAM PRODUCT FOR AUTOMATIC OPTIMIZATION OF 3D TEXTURED MODELS FOR NETWORK TRANSFER AND REAL-TIME RENDERING

CROSS-REFERENCE TO RELATED APPLICATIONS

This application is a National Stage of International patent application PCT/EP2015/070613, filed on Sep. 9, 2015, which claims priority to foreign European patent application No. EP 14306405.3, filed on Sep. 12, 2014, the disclosures of which are incorporated by reference in their entirety.

FIELD OF THE INVENTION

The present invention relates to the field of multi-dimensional digital data processing and more particularly to a system, method and computer program product for automatic optimization of 3d textured models for network transfer and real-time rendering.

BACKGROUND ART

Computer graphics are enabling the creation of complex images, including the appearance of more and more complex 3D dimensionality. In 3D computer graphics, 3D modeling is the process of developing a mathematical representation on any three dimensional surface of an object (either inanimate or living) via a specialized software. The product is called a 3D model. It can be displayed on a computer screen as a two dimensional image through a process called 3D rendering or be used in computer simulation of physical phenomena. 3D rendering is the 3D computer graphics process of automatically converting 3D wire frame models with optional material into 2D images with 3D photorealistic or non photorealistic rendering on a computer. 3D models may be created automatically or manually. 3D modeling software, called modeling applications or modelers, is a class of 3D computer graphics software used to produce 3D models.

Rendering for interactive 3D, such as games and simulations, is calculated and displayed in real-time, at rates of approximately 20 to 120 frames per second. The ultimate goal of real-time rendering is to show as much information the eye can process in a fraction of a second. In one frame, in the case of 30 frames per second, animation of a frame generally encompasses one 30th of a second. Then there is a primary compromise of achieving an as high as possible degree of rendering quality at an acceptable minimum rendering speed, generally set to 24 frames per second as being the minimum a human eye needs to see to successfully create an illusion of movement.

As 3D is more and more integrated in web applications or mobile devices, smartphones or so, many users which are not experts in the three dimensionality need to easily share with others their 3D experiences in an interactive way.

However, the problem of surface simplification is an increased problem, and no simple solution exists today. There is a need for transparent methods to simplify any 3D model in an automatic way out of any user requirements of parametrization.

Moreover, there is also the need for generating, accessing, manipulating and sharing 3D models for non expert end users.

Then, improved systems, methods and computer program products are needed to handle real-time rendering of 3D models. The present invention offers a solution to this need.

SUMMARY OF THE INVENTION

Accordingly, an object of the invention is to provide a versatile solution that is operable for all types of geometries, i.e. planar, organic, having non-standard or distorted texture coordinates. The proposed approach is user transparent, preventing a user of the need of a specific expertise in 3D modeling.

Advantageously, the process is fast and allows simplifying an original model.

Advantageously, the method allows displaying in few seconds a simplified model in one operation for a user, the simplified model having an optimized final rendering.

To achieve the foregoing object, a system, method and computer program product as further described in the appended independent claims 1, 9 and 10 are provided.

In particular, a computer-implemented method of automatic optimization of 3D textured model for network transfer and real-time rendering in a target application, comprises the step of:
  receiving 3D data content of a 3D textured model and a plurality of target parameters associated to the target application;
  extracting from the 3D data content, a geometry and a plurality of textures;
  by using a first set of the plurality of target parameters, applying aggregation and simplification algorithms on the geometry to obtain a plurality of simplified geometry versions;
  by using a second set of the plurality of target parameters, applying degradation algorithms on the plurality of textures to obtain a plurality of degraded texture versions; and
  serializing the plurality of simplified geometry versions with the plurality of degraded textures versions to obtain serialized 3D data content.

In an embodiment, the simplification step consists in applying heuristics and/or a quadric simplification. In another embodiment, a simplified geometry version is associated with respective level-of-details.

In an alternative, the aggregation step comprises a step of ranking objects of the 3D data content.

Further, the serialization step consists in serializing one simplified geometry version with one degraded texture version.

In an embodiment, the degradation step further comprises a step of converting the degraded texture version before the serialization step. In another embodiment, the serialization step consists in serializing at least one simplified geometry version with at least one converted degraded texture version.

In one embodiment, the 3D data associated with the serialized versions are stored in a local database.

The invention also provides a system comprising means adapted to carry out the steps of the method.

The invention may also be provided as a computer program product comprising a non-transitory computer readable storage medium, and program code stored on the computer readable storage medium and configured, upon execution, to cause the processor to operate the steps of the method.

Further aspects of the invention will now be described, by way of preferred implementation and examples, with reference to the accompanying figures.

BRIEF DESCRIPTION OF THE DRAWINGS

The above and other items, features and advantages of the invention will be better understood by reading the following more particular description of the invention in conjunction with the figures wherein.

DETAILED DESCRIPTION OF THE INVENTION

It is to be appreciated that same elements are referenced by same numerals throughout all figures.

Embodiments of the invention are generally directed to systems, methods, and computer program products for automatic optimization of 3d textured models for network transfer and real-time rendering in computer devices.

Figure 1:
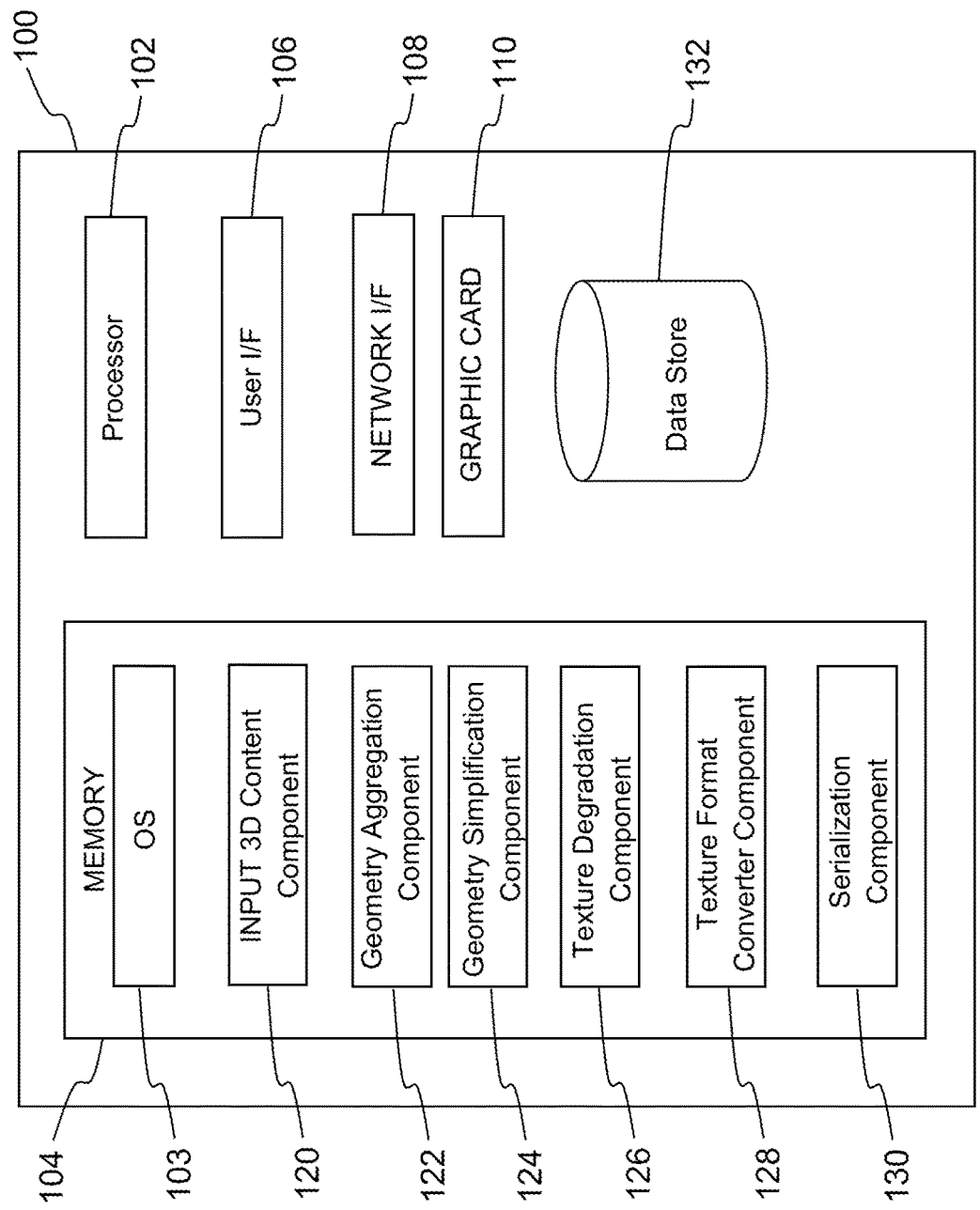
FIG. 1 depicts a general computer environment to operate the present invention.

With reference to FIG. 1, a computer device 100 for operating the present invention is shown. The computer device includes at least one processor 102 and a memory 104 coupled to the at least one processor 102. The memory 104 may represent a random access memory (RAM) as well as any supplemental levels of memory, e.g., cache memories, non-volatile or backup memories (e.g., programmable or flash memories), read-only memories, etc. In addition, memory 104 may be considered to include memory storage physically, e.g., any cache memory in a microprocessor, as well as any storage capacity used as a virtual memory, e.g., as stored on a mass storage device or on another computer coupled to the computer device 100.

For interface with a user or operator, the computer device 100 may include a user interface 106 incorporating one or more user input/output devices, e.g., a keyboard, a pointing device, a display, a printer, etc. Otherwise, data may be communicated to and from another computer over a network interface 108 coupled to any communication network. The computer device 100 may be in communication with one or more mass storage devices, which may be, for example, internal hard disk storage devices, external hard disk storage devices, external databases, storage area network devices, etc.

The computer device also includes a graphic card 110, having a video random access memory (VRAM), for computing the final rendering of a 3D content and sending it for display on the computer display.

The computer device 100 typically operates under the control of an operating system 103 and executes or otherwise relies upon various computer software applications, components, programs, objects, modules, engines, data structures, etc. In particular, the components and applications may include an input 3D content component 120, a geometry aggregation component 122, a geometry simplification component 124, a texture degradation component 126, a texture format converter component 128 and a serialization component 130.

The input 3D content component 120 may contain 3D models from a local native application that may be for example the Google Sketch Up® application or the Blender® application providing 3D models.

The computer device 100 may also include one or more databases 132 including, for example, a 3D record database, a target parameters and optimal parameters database. The 3D record database may comprise data and supporting data structures that store and organize 3D data. In particular, the 3D record database may be arranged with any database organization and/or structure including, but not limited to, a relational database, a hierarchical database, a network database, and/or combinations thereof. A database management system in the form of a computer software application executing as instructions on the processing unit of the computer device 100 may be used to access information, parameters or data stored in the databases 132.

The computer device may be coupled to a network, private and/or public networks, e.g. the Internet, that enables communication, transfer, exchange of 3D models with distant servers and/or computers of the so-called cloud communities.

Patent application titled "System, Method and Computer Program Product for injecting directly into a web browser commands and/or contents created on local desktop applications of a computer device, and vice-versa" filed the same day by the Applicant provides a detailed description of various embodiments allowing transfer of a 3D optimized model to a local web browser or a distant server.

Figure 2:
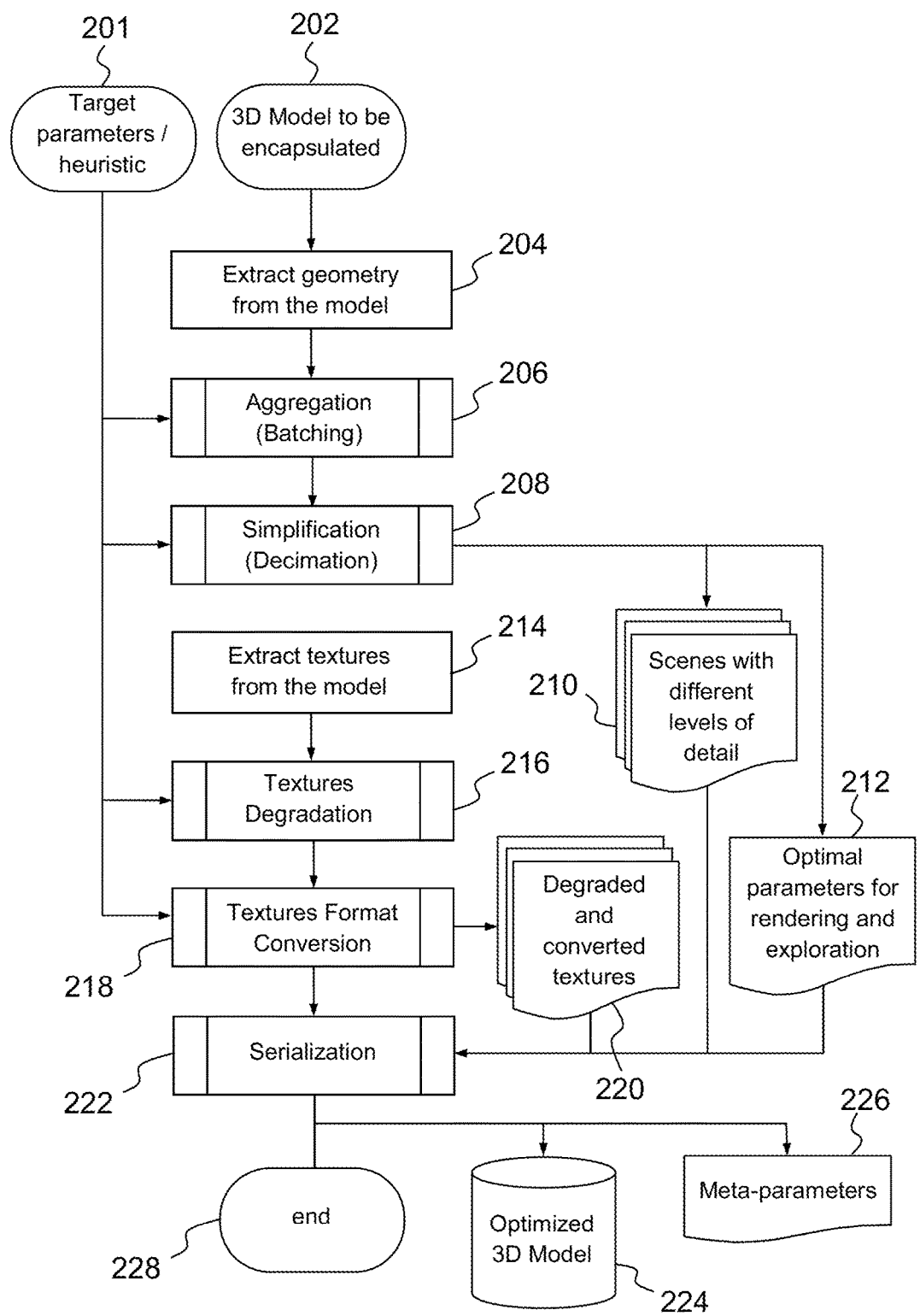
FIG. 2 is a general flow chart of the rendering process in accordance with an embodiment of the present invention.

FIG. 2 provides a general overview of an example of a workflow of an embodiment of the invention. Generally, the method comprises the steps of receiving a 3D data content and a plurality of target parameters associated to the target application; extracting from the 3D data content, a geometry and a plurality of textures; by using a first set of the plurality of target parameters, applying an aggregating algorithm on the geometry to obtain aggregated geometries follows by a simplification algorithm on the aggregated geometries to obtain a plurality of versions of simplified aggregated geometries versions; by using a second set of the plurality of target parameters, applying degradation algorithm on the plurality of textures to obtain a plurality of degradated texture versions; and serializing the plurality of simplified aggregated geometries versions with the plurality of degradated textures versions to obtain serialized 3D data content.

As now detailed, a 3D model, e.g. a model to be encapsulated or analyzed, is received at step 202. A 3D model generally comprises 3D shapes which are generally represented by polygonal meshes that define or approximate geometric surfaces. With curved surfaces, the accuracy of the approximation is proportional to the number of polygon used in the representation. Advantageously, models having a number of vertices over a predefined threshold may be split for processing to optimize the GPU computing. In an implementation, the threshold for the maximum number of vertices by model is limited to 65536 vertices.

From the received data, two families of steps are performed, preferably in parallel for speed processing purposes, but that may be operated in sequence too, with on the one hand the processing of geometry of the 3D model (steps 204-212) and on the other hand the processing of textures of the 3D model (steps 214-220) as now detailed.

A 3D geometry is extracted from the 3D model at step 204. The extraction step can be performed in several manners, as some algorithms can be faster than others. The extraction step can be repeated for a plurality of received models. After one or more geometries are extracted from one or more received models, a further step 206 can consist in aggregating (also called batching) the different geometries. In an embodiment, the plurality of geometries can be decomposed into a plurality of objects or units or sub-units, an object or unit, sub-unit being at a predetermined granularity level which permits fusion/merge of objects or sub-units. The aggregation 206 or rearrangement or composition of the global 3D scene can be led or controlled by "targets parameters" 201 (e.g. heuristics).

After the 3D scene is optionally optimized, a further step 208 consists in simplifying the scene. The simplification or decimation step as further detailed with reference to FIG. 4 can also be optimized 212. For example if most of the respective objects from the received 3D models are merged, there can be an interest not to simplify excessively the recomposed scene. For example, depending on the processing capabilities of the rendering device (computer, smartphone), the global 3D scene can be optimized for further computations. The target parameters can take into account those aspects. In an embodiment, targets parameters are associated with ranking scores and the management of associated thresholds. In particular, 3D scenes can be handled differently, for example depending on the required level of details 210. A Level-of-Detail (LOD) aims to improve rendering efficiency when dynamically viewing a scene. Detailed versions of a model may be swapped in and out of the scene database depending on the importance of the object in the current view, usually determined by image size. For example, a smartphone provided with a small screen and limited bandwidth and processing capabilities (e.g. in mobility) will require less details than a powerful home media server (with Internet browsing on HDTV and fiber to home access). The configuration for the end-user device determines the optimal parameters for rendering and exploration of the 3D scene.

To minimize the number of draw calls and optimize the decimation rendering, advantageously the target parameters used relate to material, distances and sizes. The batching consists in creating a pull queue with pairs of meshes nodes classified by order of their value. The value of each pair is calculated according to common material between the nodes, distance between the nodes and size of the nodes.

At step 214, a plurality of textures is extracted from the 3D model. The obtained textures are then degraded at step 216. A degradation step for example can comprise a data compression step. The degradation step can be driven by targets parameters 201. The textures are then converted into a particular format 218, and at step 220, degraded and or converted textures are obtained.

After geometry and texture extractions from the model, a serialization step 222 is processed. The obtained geometry and textures are gathered or assembled or merged or associated. The aggregated and/or simplified 3D models are thus associated with the degraded and/or the converted textures.

At step 224, an optimized 3D model is obtained comprising modified textures and geometries, with respect to a plurality of received 3D models. The optimized 3D model is also associated with meta-parameters 226, for example comprising the initial targets parameters, the optimal parameters as determined for a compromise between textures and geometries, and other metadata.

Figure 3:
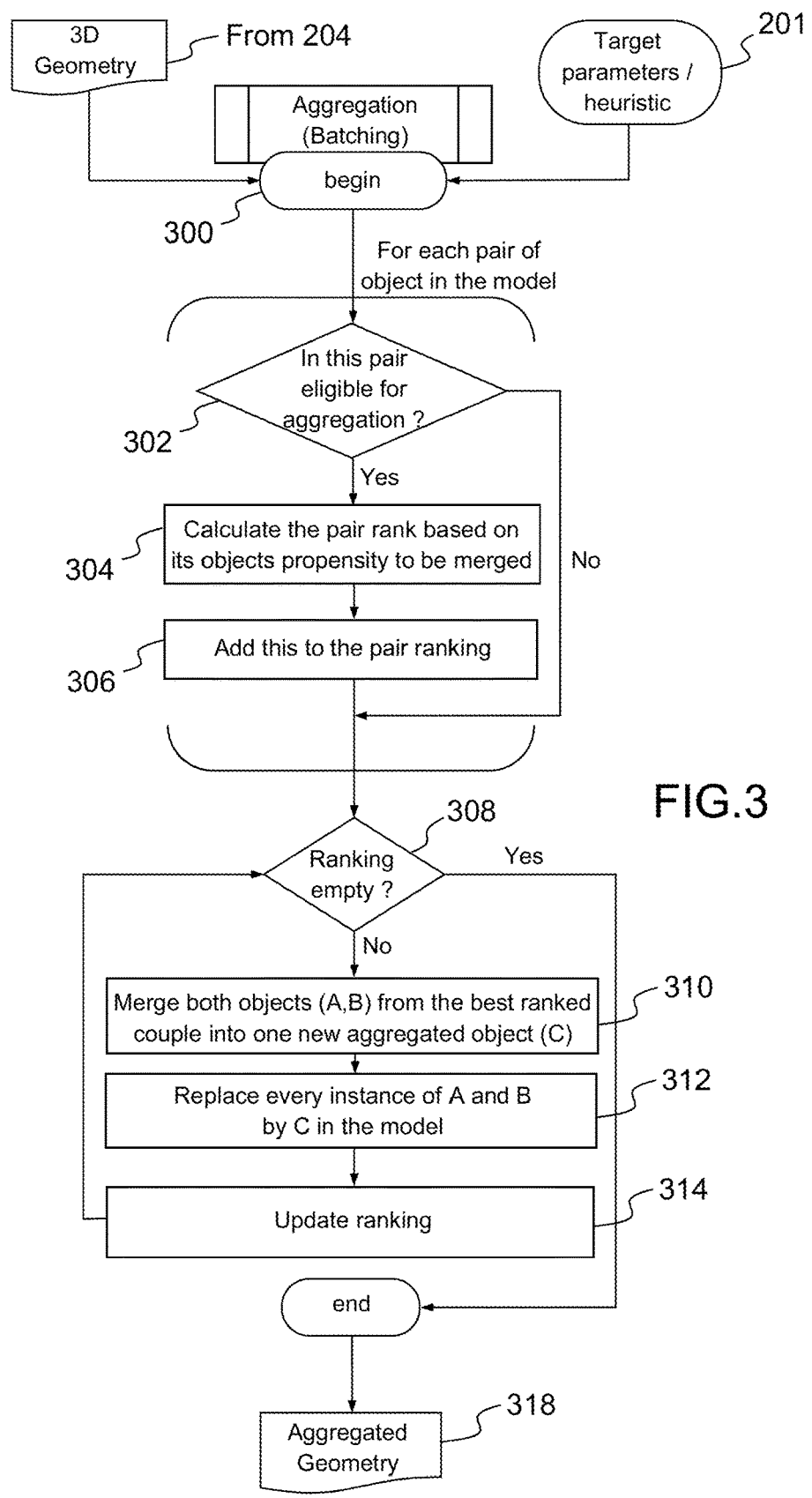
FIG. 3 is a detailed flow chart of the batching process in accordance with an embodiment of the present invention.
Figure 4:
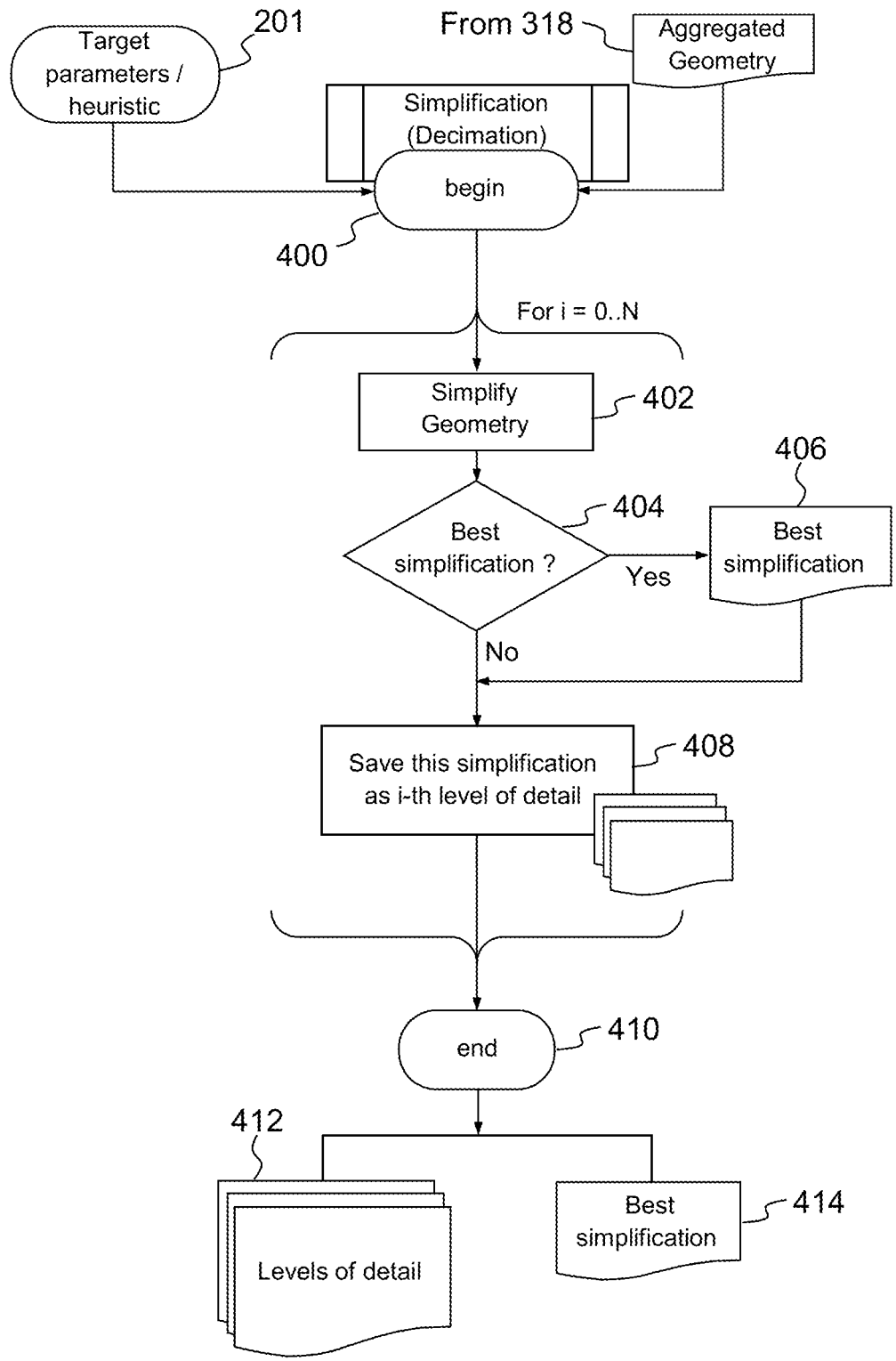
FIG. 4 is a detailed flow chart of the decimation process in accordance with an embodiment of the present invention.

FIG. 3 and FIG. 4 show some more details of the handling of the geometry and textures associated with a received 3D scene.

FIG. 3 details the aggregation step 204 (also named batching). Generally, the method is derived from the well-known quadric simplification algorithm proposed by M. Garland in "Quadric-based Polygonal Surface Simplification Michael Garland School of computer sciences Carnegie Mellon University". For the purpose of the invention, a local collapsing operator for collapsing pair of points, and a top-plan error metric are used. A 3D meshing is simplified by replacing two points by one, then deleting the degraded faces and updating the new adjacency relations. As further detailed, the general algorithm comprises the steps of setting the quadrics for each top of the original model; then identifying every pair of adjacent tops linked by vertices or geometrically closed. For each pair, computing the best point for collapsing and the associated error; then inserting the pairs into an error ranking priority list, and collapsing the top pair. The process is repeated to obtain a fixed number of faces or a maximum defined error. Advantageously, by adding specific heuristics to the quadratic algorithm process, the method of the present invention allows adapting the simplification computation to the nature of the surface, the frontiers of the model and frontiers between different textures.

So, as now detailed, geometries are decomposed or arranged into a plurality of objects at step 300. One or more pairs of objects are determined in the model, a pair can be that some objects are to be assimilated by considering predefined thresholds. At step 302, the process allows determining whether a considered pair is eligible for aggregation. If applicable, a pair rank is computed 304, based on the objects' propensity to be merged. The pair rank is then added to a ranking list on step 306. Then, steps 302 to 306 are repeated for the plurality of pairs of objects derived from the 3D scene, so that to complete the ranking operation. At step 308, the process allows determining if the rank list is empty. If yes, the batching process ends, and the aggregated geometry 318 obtained is further used for a simplification process (as detailed with reference to FIG. 4). If not, the objects from the best ranked pair of objects are merged 310 into a single new aggregated object. At step 312 each and every instance of the objects from the pair of objects are replaced by the new aggregated object. And at step 314, the ranking is updated. Optionally, the new aggregated object is not eligible for a new aggregation. After the plurality of objects composing the 3D scene have been ranked and merged, the final aggregated geometry is obtained at step 318.

FIG. 4 details the simplification step 208 (also named decimation). The aggregated geometry previously obtained at step 318 can be optionally simplified on step 402, using mesh simplification algorithms. Mesh simplification reduces the number of polygons in the mesh while remaining faithful to the topology or shape of the original mesh. Simplification operations comprise collapsing one or more edges by combining one or more vertices, using quadric errors, using simplification envelopes or parallel mesh simplification, distributed simplification, parallel hierarchical level of detail or parallel view-dependent mesh refinement. In a particular implementation targeting a rendering for mobile devices and tablets, the simplification step aims to decimate the batched model to fit 2 millions triangles.

The process allows determining if the simplification is optimum 404. Whenever possible, a best simplification mode 406 is executed with respect to target parameters and the improved simplification is saved on step 408. In the end 410, one or more best simplifications (414) are obtained associated with one or more levels of detail (412).

Figure 5:
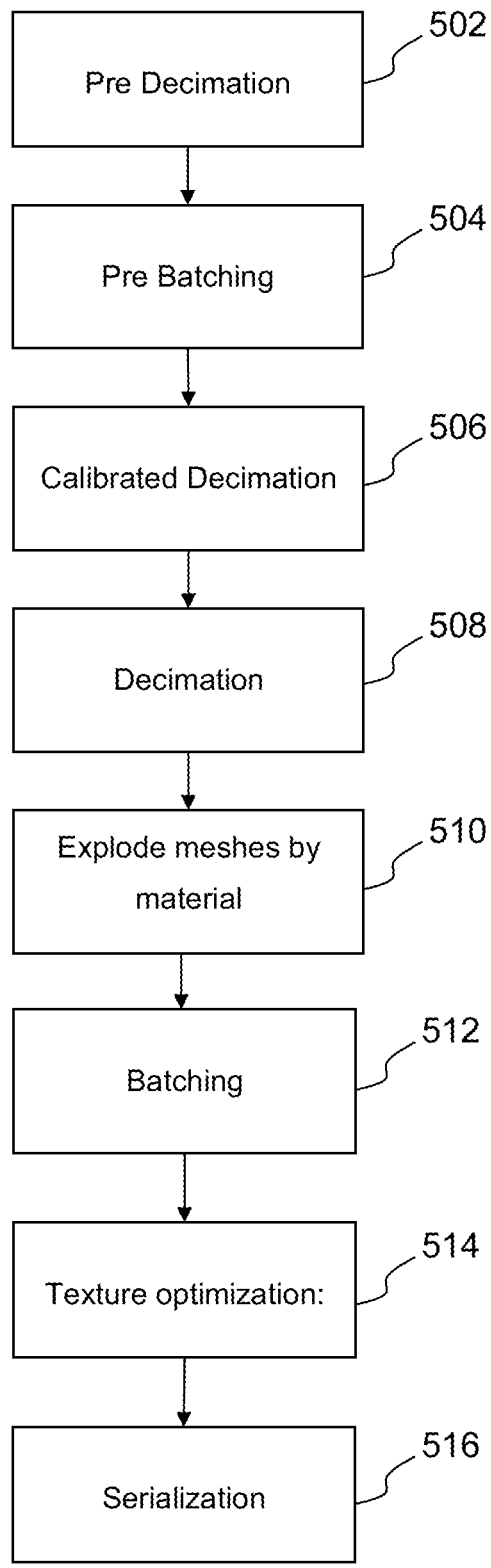
FIG. 5 is a flow chart of an alternate embodiment of the process for optimizing a 3D model.

Going to FIG. 5, an alternate embodiment of the process for optimizing a 3D model is now described.

The process begins with a two-steps pre-phase of a pre-decimation phase and pre-batching phase aiming processing small and dense 3D models. The pre-decimation step 502 aims to sort the models by their density and for a 3D model having a number of triangles over a predefined threshold, i.e. heavy model, the model is pre-decimated to minimize the mesh colliders. The pre-batching operation 504 aims to process small isolated objects within a scene. For example, a 3D scene having a table, a plurality of plates and a flowerpot, the flowerpot is considered as one small (in term of number of triangles) isolated (in term of being one instance) object. A small isolated object is batched and assembled with another small object to generate a new object.

Next step 506 allows applying a calibrated decimation if the total number of triangles of the initial 3D model exceeds a predefined threshold. The predefined threshold is defined as a target parameter depending on the target device for the rendering of the 3D model.

In an application, the maximum numbers of triangles is of the order of 2 millions of triangles. The process of the invention allows by the successive steps to decimate a 3D model down to 2 millions of triangles to have it displayed in real time on tablets and mobile devices. In this application, the threshold for applying the calibrated decimation step is set to 2 millions of triangles.

The calibrated decimation allows determining which triangles are to be deleted to limit the number of triangles. A weight is computed for each model depending on its number of triangles, its nature of isolated instance or not. Taking the example of the scene with the table and numerous plates, the process would assign a more important weight to the table than to the plates, and if the number of triangles is to be reduced by 15%, the process would apply at next step 508, a decimation on some of the triangles of the plates while not on the table to preserve the quality of the final rendering. The calibrated decimation step allows generating values of decimation for each model representing a number of triangles to delete.

Then, next step 508 allows a decimation operation on the models applying the results of the weighting computation. New decimated models are generated.

A next step 510 allows classifying the models by their material. The process further allows determining when a model is made of more than one material. For the previous example of the plates, if the plate is made of two different materials, the process allows exploding the plate for classifying it by a material for the top surface and a different material for the bottom surface. Two models are generated for the plate.

Next, the process allows applying a batching step 512 on the classified models to determine which models are to be grouped according to the results of the previous step. The batching is run to meet a predefined target parameter of the number of draw calls. Draw calls are often expensive, with the graphics API doing significant work for every draw call, causing performance overhead on the CPU side. The batching step of the present invention allows improving the GPU memory use.

In a commercial application, a maximum number of draw calls to the GPU is to be less than 500 draw calls to allow a 3D model be displayed in real time on tablets and mobile devices. Then, in this application the draw call target parameter for the batching step is set under 500 draw calls to batch the model by material down to 500 material instances.

Finally, the generation of a batched model is made during the rendering of the real time 3D in the web browser.

Next step 514 allows applying a texture optimization operation. The texture optimization process runs an operation to resize the original size of the texture (texture format conversion). Preferably, the size is limit up to 1024×1024 pixels. Then all the textures are resized square by a power of 2 with a minimum of 16 pixels by side such as: 16×16, 32×32, 64×64, 128×128, 256×256, 512×512, and 1024×1024.

As such, this texture size allows maximizing GPU memory and improving computing time. By ensuring the texture dimensions are a power of two, the graphics pipeline can take advantage of optimizations related to efficiencies in working with powers of two, for example, it can be faster to divide and multiply by powers of two. Still advantageously, working in powers of two also simplified operations within the pipeline, such as computation and usage of mipmaps, i.e. a number that is a power of two will always divide evenly in half, meaning that there is no need to deal with scenarios where it must round the mipmap dimensions up or down.

So, the texture optimization step aims to meet the target rendering using texture target parameters. One texture target parameter is the number of textures. In a commercial application the limit is set up to 128 Megabytes. Another texture target parameter is link to the size of the final texture. The size of the final texture depends on the applied surface in the 3D model compare to the total surface. For example, if a texture of 75×49 pixels represents 50% of the total surface of the 3D model, the texture is resized to 64×64. However, if the same texture represents 1% of the total surface of the 3D model, the process allows resizing it to 16×16. To achieve this result, the surface by material is calculated, and the total surface of each material is weighted with the total surface of the model and the memory limit.

In an embodiment to optimize the texture size, the alpha channel is extracted. The PNG image format with alpha channel is compressed in JPEG format. The alpha channel is stored in binary format, one byte per pixel. Then, on mobile devices, the JPEG format is encoded in PVRTC format for IOS or in ETC1 format for Android. Advantageously, the encoding operation allows optimizing the number of textures related to the memory limit.

Finally, the next step 516 allows serialization of the binary data as previously described in step 222.

The embodiment described with reference to FIG. 5 allows having a decimation operation applies only on the definition of the models thereby having a faster decimation. Moreover, as the files describing the models are smaller with the batching operation, the transfer of the files is greatly improved.

The present invention is particularly of interest for end users that are not expert in 3D programming. Advantageously, with the simple approach proposed by the invention, those users may easily import a 3D model in their specific environment would it be in any commercial domain where interactive models are required to allow evaluating their impact into a specific real time environment, such in urbanism, architecture, gaming, or any other industrial domain.

Advantageously, the present invention offers simplification algorithms of 3D complex models allowing a final optimized rendering model with no user interaction, in an automatic way, the generation of models having the appropriate levels of detail determined for the current context. Moreover, with the proposed simplification algorithm, the context discontinuities are preserved, i.e. the planar frontiers, textures, composite objects, angles, and so.

The person skilled in the art will appreciate that the embodiment has been presented for purposes of illustration and description, and is not intended to be exhaustive nor limiting the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It has to be appreciated that while the invention has been particularly shown and described with reference to a preferred embodiment, various changes in form and detail may be made therein without departing from the spirit, and scope of the invention. The present invention can take the form of a computer program product accessible from a computer-usable or computer-readable medium providing program code for use by, or in connection with a computer or any instruction execution system. For the purposes of this description, a computer-usable or computer-readable medium can be any tangible apparatus that can contain, store, communicate, propagate, or transport the program for use by, or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The invention claimed is:

1. A computer-implemented method of automatic optimization of 3D textured models, the method comprises the steps of:
   extracting with at least one processor from a 3D textured model composed of a plurality of meshes, a 3D geometry and a plurality of textures;
   by using with the at least one processor a first set of target parameters from a database of parameters, wherein the database comprises target parameters and optimal parameters predefined for target applications and target devices, applying an aggregating algorithm on the 3D geometry to obtain an aggregated 3D geometry, and applying a simplification algorithm on the aggregated 3D geometry to obtain a plurality of simplified 3D geometry versions;
   by using with the at least one processor a second set of target parameters from the database of parameters, applying a degradation algorithm on the plurality of textures to obtain a plurality of degraded texture versions;
   serializing with the at least one processor the plurality of simplified 3D geometry versions with the plurality of degraded textures versions to obtain a plurality of serialized 3D data content; and
   by using with the at least one processor a set of optimal parameters, the optimal parameters being selected from the database of parameters for a target application and a target device, generating an optimized 3D textured model from a simplified geometry and a degraded texture, the optimized 3D textured model being optimized for real-time rendering in the target application of the target device.

2. The method of claim 1 wherein the simplification step comprises applying heuristics and a quadric simplification.

3. The method of claim 2 wherein a simplified 3D geometry version is associated with respective level-of-details.

4. The method of claim 3 wherein the aggregation step comprises a step of ranking objects of the 3D geometry.

5. The method of claim 1 wherein the serialization step consists in serializing one simplified 3D geometry version with one degraded texture version.

6. The method of claim 1 wherein the degradation step further comprises a step of converting the degraded texture version before the serialization step.

7. The method of claim 6 wherein the serialization step consists in serializing at least one simplified 3D geometry version with at least one converted degradated texture version.

8. The method of claim 1 further comprising the step of storing the plurality of serialized 3D data content.

9. The method of claim 1 wherein the simplification step comprises applying heuristics.

10. The method of claim 9 wherein a simplified 3D geometry version is associated with respective level-of-details.

11. The method of claim 10 wherein the aggregation step comprises a step of ranking objects of the 3D geometry.

12. The method of claim 1 wherein the simplification step comprises applying a quadric simplification.

13. The method of claim 12 wherein a simplified 3D geometry version is associated with respective level-of-details.

14. The method of claim 13 wherein the aggregation step comprises a step of ranking objects of the 3D geometry.

15. A computer program product comprising non-transitory instructions for carrying out the steps of the method according to claim 1 when said non-transitory instructions of the computer program product are executed on a suitable computer device.

16. A system for automatic optimization of 3D textured models, the system comprising:
   at least one processor configured to extract from a 3D textured model composed of a plurality of meshes, a 3D geometry and a plurality of textures;
   the at least one processor using a first set of target parameters from a database of parameters, wherein the database comprises target parameters and optimal parameters predefined for target applications and target devices, applying an aggregating algorithm on the 3D geometry to obtain an aggregated 3D geometry, and applying a simplification algorithm on the aggregated 3D geometry to obtain a plurality of simplified 3D geometry versions;
   the at least one processor using a second set of target parameters from the database of parameters, applying a degradation algorithm on the plurality of textures to obtain a plurality of degraded texture versions;
   the at least one processor serializing the plurality of simplified 3D geometry versions with the plurality of degraded textures versions to obtain a plurality of serialized 3D data content; and
   the at least one processor using a set of optimal parameters, the optimal parameters being selected from the database of parameters for a target application and a target device, generating an optimized 3D textured model from a simplified geometry and a degraded texture, the optimized 3D textured model being optimized for real-time rendering in the target application of the target device.

* * * * *